(12) United States Patent
Asfour

(10) Patent No.: US 8,351,604 B2
(45) Date of Patent: Jan. 8, 2013

(54) CODING METHOD, DECODING METHOD, CODEC AND DATA STORAGE MEDIUM FOR HOLOGRAPHIC STORAGE

(75) Inventor: Jean-Michel Asfour, Weinheim (DE)

(73) Assignee: Bayer Innovation GmbH, Dusseldorf (DE)

( * ) Notice: Subject to any disclaimer, the term of this patent is extended or adjusted under 35 U.S.C. 154(b) by 871 days.

(21) Appl. No.: 12/515,331

(22) PCT Filed: Nov. 13, 2007

(86) PCT No.: PCT/EP2007/009795
§ 371 (c)(1),
(2), (4) Date: Jun. 12, 2009

(87) PCT Pub. No.: WO2008/061652
PCT Pub. Date: May 29, 2008

(65) Prior Publication Data
US 2010/0046750 A1    Feb. 25, 2010

(30) Foreign Application Priority Data

Nov. 24, 2006    (DE) .................. 10 2006 055 480

(51) Int. Cl.
*H04L 9/00*    (2006.01)
(52) U.S. Cl. .......................... 380/54; 713/193
(58) Field of Classification Search .................. 380/201, 380/210; 359/1, 2; 713/190, 191, 193, 189
See application file for complete search history.

(56) References Cited

U.S. PATENT DOCUMENTS

| | | | |
|---|---|---|---|
| 3,894,756 A | 7/1975 | Ward | |
| 4,400,616 A | 8/1983 | Chevillat et al. | |
| 5,907,581 A | 5/1999 | Ashley et al. | |
| 6,064,586 A | 5/2000 | Snyder et al. | |
| 7,315,407 B2 | 1/2008 | Menz et al. | |
| 7,315,501 B1 | 1/2008 | Ramanujam et al. | |
| 2003/0223102 A1* | 12/2003 | Thor et al. | 359/15 |

(Continued)

FOREIGN PATENT DOCUMENTS

DE    23 60 451    10/1985

(Continued)

OTHER PUBLICATIONS

Guo et al., "Decomposition storage of information based on computer-generated hologram interference and its application in optical image encryption," in Applied Optics, OSA, Optical Society of America, Washington, DC, Jun. 10, 2001, pp. 2860-2863, vol. 40, No. 17. xp001103065 ISSN: 003-6935.

(Continued)

*Primary Examiner* — Gilberto Barron, Jr.
*Assistant Examiner* — Izunna Okeke
(74) *Attorney, Agent, or Firm* — Baker Donelson Bearman Caldwell & Berkowitz PC

(57) ABSTRACT

In a coding method for the encryption of information worth protecting on a holographic data storage medium, an item of information (I; $I_1$, $I_2$) to be encrypted is converted into a graphic data image ($D_1$, $D_2$), which is in turn converted into a hologram in order to write the holographic data storage medium (4) therewith. The invention provides for the hologram to be changed graphically before the writing of the holographic data storage medium (4). As a result of the manner in which the hologram is changed graphically, encryption which is less susceptible to faults is achieved in a simple way, which presents increased resistance to a parallelized brute force attack.

19 Claims, 7 Drawing Sheets

U.S. PATENT DOCUMENTS

2006/0078113 A1 4/2006 Javidi et al.

FOREIGN PATENT DOCUMENTS

| EP | 0 699 979 | 3/1996 |
| --- | --- | --- |
| EP | 1355217 | 10/2003 |
| GB | 2196443 | 4/1988 |
| GB | 2245983 | 1/1992 |
| KR | 1020050103430 | 10/2005 |

OTHER PUBLICATIONS

International Search Report in PCT/EP2007/009795 dated May 14, 2008 (3 pages).

* cited by examiner

CODING METHOD, DECODING METHOD, CODEC AND DATA STORAGE MEDIUM FOR HOLOGRAPHIC STORAGE

CROSS REFERENCE TO RELATED APPLICATIONS

This application is a §371 National Stage Application of PCT/EP2007/009795 filed Nov. 13, 2007 which claims priority from German Application 10 2006 055 480.9 filed Nov. 24, 2006.

BACKGROUND OF THE INVENTION

1. Field of the Invention

The invention relates to a method for the secure storage of information worth protecting, which can contain a coding method and a decoding method. Furthermore, the invention relates to a coder/decoder ("codec") for implementing the method and to a data storage medium for the holographic storage of encrypted data, which can be produced by the coding method.

2. Description of Related Art

In order to protect information, it is generally converted into a digital format and then encrypted by means of a cryptographic encryption method in such a way that it can be decrypted substantially only with knowledge of the key used. In the case of good encryption, the time expenditure for finding the key to decrypt the encrypted information with the aid of a computer is so high that an attempt to carry out decryption becomes unattractive to unauthorized persons. The reason for this is that trying out various keys ("brute force attack"), for example by different passwords being tried out repeatedly, lasts a very long time in the case of a password having many digits and a correspondingly high entropy. The disadvantage in this case, however, is that the encrypted information present in digital form can be copied many times, so that, for example, it can be stored on many different computers via the Internet, it being possible for another range of possible keys to be tried out on each computer (parallelized attack).

In order to prevent copying of the encrypted information, it is known to provide copy protection. For example, EP 1 355 217 discloses providing hidden features in the storage medium on which the encrypted information is stored, which features have to be checked before the actual data are read out. During the copying of the data storage medium, the hidden feature is overlooked as not belonging to the file, so that the feature is not copied as well and, as a result, the copy is not complete. However, this copy protection can be circumvented by a copying program not only copying regions of a storage medium identified as data but all the regions of the storage medium, irrespective of whether they are identified as used or unused regions. Despite copy protection, it is therefore possible to prepare as many copies of the encrypted information as desired, in order to have them decrypted by a plurality of different computers.

U.S. Pat. No. 3,894,756 discloses the provision of holographic data storage in which, during the production of the hologram, an object beam has a randomly modulated reference beam superimposed on it. This leads to optical encryption of the information to be stored. The same modulation must be used when reading. The disadvantage with this coding method is that, in order to provide the modulated reference beam, a mechanism having movable components is required which is accordingly susceptible to faults, not least on account of wear phenomena and the requirement for particularly exactly controlled positions. Even a single slight error during the creation of the hologram, which, for example, can arise as a result of a slight knock against the apparatus used, leads to damaged information, which can no longer be reconstructed even by an authorized user.

The object of the invention is to provide a coding method, a decoding method, a codec and a data storage medium for holographic storage which presents greater resistance to a parallelized brute force attack and is simple to handle with a reduced susceptibility to faults.

SUMMARY OF THE INVENTION

According to the invention, the object is achieved by a coding method having the features of claim 1, a decoding method having the features of claim 8, a codec having the features of claim 13 and a data storage medium having the features of claim 17. Further refinements of the invention are specified in the subclaims.

DETAILED DESCRIPTION OF A PREFERRED EMBODIMENT

In the coding method according to the invention for encrypting information worth protecting on a holographic data storage medium, first of all an item of encrypted information is provided, the information being present in particular in a digital format. The item of information to be encrypted can also be relatively small portions of a larger overall item of information. The information is then converted into at least one graphic data image, so that the information is present in a graphic format. For example, the data image consists of a sequence of white and black squares, which each correspond to one bit of the information present in digital form. It is also possible for different colours or grey steps to be used in order to increase the data density. The graphic data image is then converted into at least one hologram, in order to write the holographic data storage medium with the hologram. The holograms are in particular produced by being computer-generated, for example with the iterative Fourier transformation algorithm (IFTA).

According to the invention, before the holographic data storage medium is written with the hologram, the hologram is changed graphically. The graphic change in the hologram represents a further encryption level, which is independent of digital encryption. Even with knowledge of a password for the decryption of a digital encryption method which may have been carried out previously, still no practical information can be gathered from the holographic data storage medium. As a result, in particular the transport of the encrypted information from one computer to another computer is protected better, so that the encrypted information has not yet been lost if the holographic data storage medium falls into unauthorized hands. The graphic change in the hologram can be made reversible, for example with the aid, in particular, of a self-deleting program, it being possible for this program to reach the destination computer by a different route. For instance, the hologram can be stored on a holographic data storage medium dispatched by post, while the decryption program with which the graphic change is made reversible can be downloaded via the Internet following the entry of a registration number that can be allocated individually. Since the graphic change in the hologram can be performed particularly simply, in particular in the case of computer-generated holograms, improved protection against decryption of the information worth protecting is achieved by means of a simple measure which is barely susceptible to faults. Since the graphic change in the hologram breaks up and rearranges the information, encryption is achieved which is not ordered sequentially in relation to the original information, by which means decryption by means of a parallelized brute force attack is at least made considerably more difficult. Since the hologram can be changed graphically before the holographic data storage medium is written, a mechanism of a decoder to be used which is complicated and susceptible to faults is avoided for the writing operation.

In a preferred embodiment of the coding method according to the invention, the graphic data image is divided up into at least two subregions during the conversion of the graphic data image. The subregions are then converted into the hologram in the form of a two-dimensional pattern in a preferably defined sequence, the two-dimensional pattern being defined uniquely with the aid of an image key. The holographic data storage medium is then written with this hologram. In the image key, it is possible to define the order in which the individual subregions are processed. For example, a rectangular data image which consists of a plurality of square subregions can be processed line by line or column by column or in any desired sequence of the subregions. Furthermore, in the image key, each subregion can be assigned a displacement and/or rotation in relation to its initial position. For instance, a rectangular data image is divided up into a plurality of square subregions of equal size, it being possible for a specific subregion to be displaced in the horizontal and/or vertical direction by a defined number of subregions and/or in particular rotated through a multiple of 90°. If, during the conversion of the graphic data image, subregions should overlap in the converted data image, the data density can be increased in these regions if necessary, for example by the resolution being increased appropriately in these regions or more grey steps being permitted.

Additionally or alternatively, the graphic data image can be converted in an intermediate step into an intermediate hologram, this intermediate hologram being divided up into at least two subregions and these subregions then being converted into the hologram in the form of the two-dimensional pattern in an in particular defined sequence with the aid of the image key which defines the two-dimensional pattern uniquely. The conversion can in particular be carried out as explained above by using the conversion of the data image. The hologram produced in this way is then written onto the holographic data storage medium. The image key can for example contain information about the number of subregions into which the graphic data image and/or the intermediate hologram is divided up, what shape and arrangement the two-dimensional pattern has and also which subregion is arranged at which point in the pattern. The number of subregions has an influence on how many differently arranged two-dimensional patterns are possible and in which way the subregions are sorted into the two-dimensional pattern. The number of subregions and/or patterns is in particular chosen in such a way that the entropy, that is to say the complexity of the encryption, is a maximum.

The graphically changed hologram, that is to say the two-dimensional pattern, in particular does not have the same external contour of the intermediate hologram or the hologram into which the graphic data image would have been converted without graphic change. Since the graphic data image is usually configured as densely and compactly as possible, the hologram changed graphically in this way results in a two-dimensional pattern having unused interspaces. These unused interspaces are preferably filled with holographic data which, for example, is non-relevant interference information. The fact that the interspaces are filled means that the two-dimensional pattern of the hologram having the encrypted information cannot be determined by any examination of the holographic data storage medium. Particularly preferably, the unused interspaces are at least partly filled with a further hologram which has been produced from a further encrypted item of information. The graphic changing of this further hologram is in this case carried out in particular while taking into account the previously used image key which was used during the production of the graphically changed hologram. This ensures that the holograms do not overlap and information is not inadvertently destroyed. If exactly two graphically changed holograms are to be nested in each other, the image key for the encryption of the second hologram can consist in the inverse version of the image key for the encryption of the first hologram. Particularly preferably, a plurality of holograms are nested in one another, for example in order to create a hologram block of standardized size. As a result of the high number of holograms nested in one another, a plurality of image keys are needed, so that the complexity of the encryption is increased in a particularly simple way.

The holograms stored on the holographic data storage medium can be stored, for example, as an amplitude hologram or polarization hologram. Since amplitude holograms can be copied by the "contact printing" method, polarization holograms are preferred. If a polarization hologram is produced by writing the holographic data storage medium with the hologram, copying the holographic data storage medium is made more difficult. In particular, in order to copy the holographic data storage medium, optical systems are needed which first have to be set and adjusted in order to read the polarization hologram optically. Since this is considerably more time-consuming as compared with data present in digital form, the mass copying of the holographic data storage medium is made more difficult, because of the considerably increased expenditure on time. Photo-addressable polymers are particularly preferably used in the holographic data storage medium, since these permit the storage of polarization holograms.

In order to increase the complexity of the encryption further, provision is preferably made to divide up the information to be encrypted into at least two part items of information, in order to encrypt the respective part items of information in the further course of the method separately in each case with the aid of the image key or with different image keys. Particularly preferably, the information to be encrypted is previously divided up into at least two part blocks, which are divided up into the part items of information with the aid of an information key. For example, the information to be encrypted can be divided up into a plurality of part blocks of equal or different length, the part blocks being divided up into the at least two part items of information alternately or, according to a different method, in a specific sequence. Since, as a result, the information is broken up into a plurality of parts and reassembled within the part items of information produced, additional encryption of the information worth protecting is achieved.

Preferably, during the conversion of the information, which can also be a part item of information, into at least one graphic data image, use is made of a conversion key by means of which the number, the size and the rastering of the graphic data image is defined. The fact that the information can also be converted into more than one graphic data image means that the complexity of the encryption can be increased. Furthermore, the chosen rastering of the graphic data image, that is to say how small or large the two-dimensional region is which corresponds to one bit of an item of information present in digital form, can make necessary a setting of a reader which has to be performed correspondingly physically. The expenditure on time which is required in order to try out various settings makes decryption of the stored hologram unattractive. In particular if interfering information is provided in the data image, of which the rastering is twice as fine as the screening of the encrypted information, unauthorized users are tempted to assume too fine a raster, so that the hologram cannot be decrypted into the corresponding digital form.

The invention relates further to a decoding method with which the information encrypted in accordance with the coding method described above can be decrypted. In a decoding method according to the invention, firstly a holographic data storage medium which has at least one hologram is provided. The holographic data storage medium is then irradiated with a beam of energy which, in particular, is a laser beam, in order to read the hologram. The beam of energy reflected at the holographic data storage medium is received with the aid of a receiver in order to convert the hologram into a graphic data image. According to the invention, the beam of energy strikes a filter, which allows the beam of energy to pass through only partly. The beam of energy passes through the filter in such a way that the beam of energy strikes the receiver in a two-dimensional pattern, the two-dimensional pattern being defined uniquely by an image key.

The part of the beam of energy which is reflected and/or absorbed by the filter corresponds to the part of the hologram stored on the holographic data storage medium which is not relevant to the reconstruction of the item of information to be decrypted. By means of the stencil-like filtering of the beam of energy, only that part of the hologram which corresponds to the information to be decrypted is received by the receiver. The image key used for the graphic change in the hologram is manifested in the filter with regard to the two-dimensional pattern defined by the image key. The filter can be a component which can simply be inserted into a suitable apparatus during the decryption of the hologram. If there is only a limited number of filters, protection of the encrypted information can be ensured by means of the monitoring of the filters, so that as a rule only sketchy monitoring of the holographic data storage medium used is less relevant to security.

The beam of energy preferably strikes the holographic data storage medium already in the two-dimensional pattern. The filter is therefore preferably arranged in the beam path of the incoming beam of energy and not in the beam path of the reflected beam of energy. Possibly disadvantageous scattering effects are avoided thereby. Furthermore, the partial irradiation of the holographic data storage medium can be checked more easily.

In a preferred embodiment, the filter used is a liquid crystal display or use is made of a filter which has a liquid crystal display. With the aid of the liquid crystal display, the filter, which in particular modulates the amplitude of the beam of energy physically, is able to set different two-dimensional patterns particularly simply. The same filter can thus impress the two-dimensional patterns of various image keys on the beam of energy. Particularly preferably, the liquid crystal display is connected to a computer unit in which at least one image key is stored. As a result, the pattern impressed by the liquid crystal display can be created as a function of the image key stored in the computer unit. This permits the commercial application of the decoding method according to the invention for users who, in particular, are interested in technology that can be used flexibly.

The invention relates further to a coder/decoder ("codec"), that is to say a device for encoding and/or decoding an item of information that is present in holographic form. The codec has a radiation source for the production of a beam of energy, in particular a laser beam. With the aid of a lens arrangement, the holographic data storage medium can be irradiated with the beam of energy. Furthermore, the codec has a holding device for holding a holographic data storage medium. The holding device and the lens arrangement can be moved relative to each other in such a way that the holographic data storage medium can be irradiated at a plurality of points, in particular at all points of one side. Furthermore, a receiver is provided for the detection of the beam of energy reflected from the holographic data storage medium. According to the invention, a filter is arranged in the beam path of the beam of energy and changes the beam of energy in such a way that the beam of energy irradiates the receiver in a two-dimensional pattern, the two-dimensional pattern being defined uniquely by an image key. The codec according to the invention is in particular designed and developed as described above by using the coding and/or decoding method.

The invention relates further to a data storage medium for the holographic storage of encrypted data, which has a data storage element for the storage of a hologram. According to the invention, the data storage element has a plurality of holograms which have the form of a two-dimensional pattern. The two-dimensional pattern is defined uniquely by an image key. Since the holograms thus are not arranged ordered sequentially in the data storage element, encryption of the stored data is achieved by this simple measure. Only with the knowledge of the image key can the relevant regions of the data storage element in which the information is stored be determined.

The data storage element preferably has a plurality of hologram blocks of standardized size, the program block having at least two holograms associated with an item of information. The holograms are in particular nested in one another in such a way that unused intermediate regions are avoided. In this way, the form of the two-dimensional pattern is veiled.

Particularly preferably, the data storage element has a film with photo-addressable polymers. In particular by means of the photo-addressable polymers, it is possible to store the holograms in the data storage element preferably as polarization holograms. As a result, copying of the data storage medium is avoided.

In the following text, the invention will be explained in more detail with reference to the appended drawings, in which.

Figure 1:
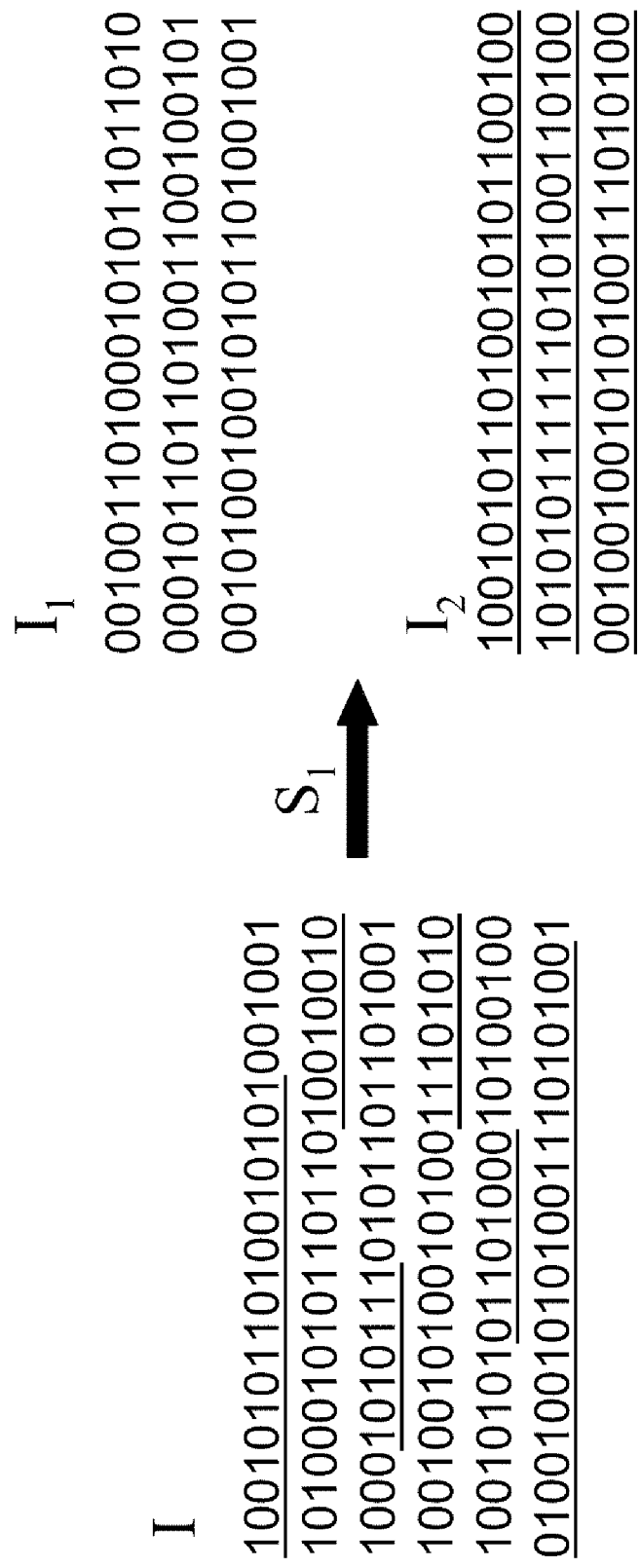
FIG. 1 shows a first step of a coding method according to the invention.

In a first step (FIG. 1) of the coding method according to the invention, an item of information I is divided up into two part items of information $I_1$, $I_2$. In order already to achieve first encryption during the division of the item of information I into two part items of information $I_1$, $I_2$, the item of information I has been divided up into a plurality of part blocks, the part blocks in FIG. 1 being illustrated one after another by means of underlined numbers and non-underlined numbers. During the division of the item of information I into the two part items of information $I_1$, $I_2$, the part blocks which are illustrated by underlined numbers are assigned to the part item of information $I_2$, and the part blocks which are illustrated as not underlined are assigned to the part item of information $I_1$. The manner in which the item of information I is divided up into part blocks in order then to allocate it to at least two part items of information $I_1$, $I_2$ is defined by an information key $S_1$.

Figure 2:
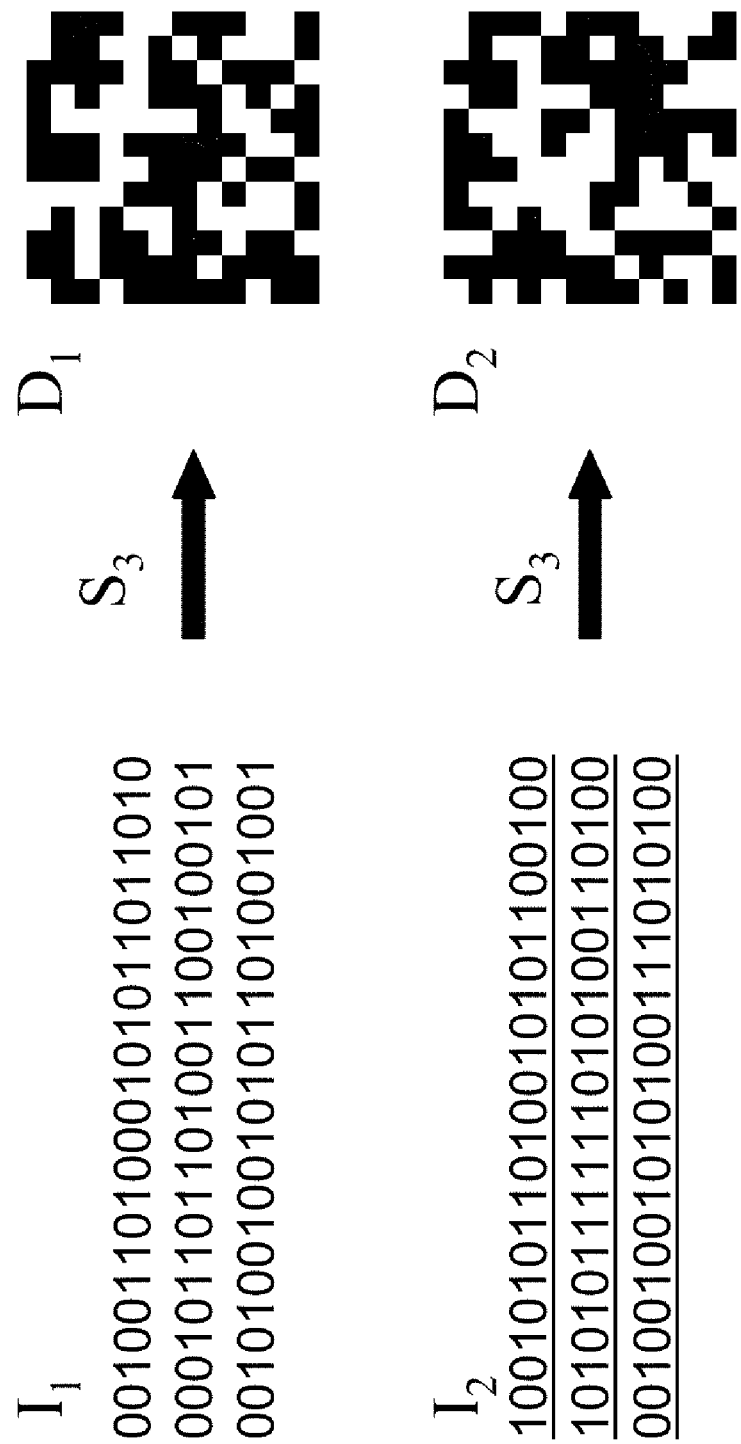
FIG. 2 shows a second step of the coding method.

In a second step (FIG. 2) of the coding method, the part items of information $I_1$, $I_2$ are each converted into a graphic data image $D_1$, $D_2$. The graphic data image $D_1$, $D_2$ can be a bar code. The graphic data image $D_1$, $D_2$ is preferably a matrix code, since a matrix code is able to encode more information with the same surface requirement than a bar code. In the exemplary embodiment illustrated, the graphic data images $D_1$, $D_2$ are assembled from a sequence of white and black squares, each square corresponding to one bit of the items of information $I_1$, $I_2$ present in digital form. The size of the graphic data image $D_1$, $D_2$ and the size of the white and black squares used (rastering) is defined by a conversion key $S_3$. Furthermore, during the conversion of the part items of information $I_1$, $I_2$, splitting into individual part blocks can be carried out immediately, as described above by using the information key $S_1$ (FIG. 1).

Figure 3:
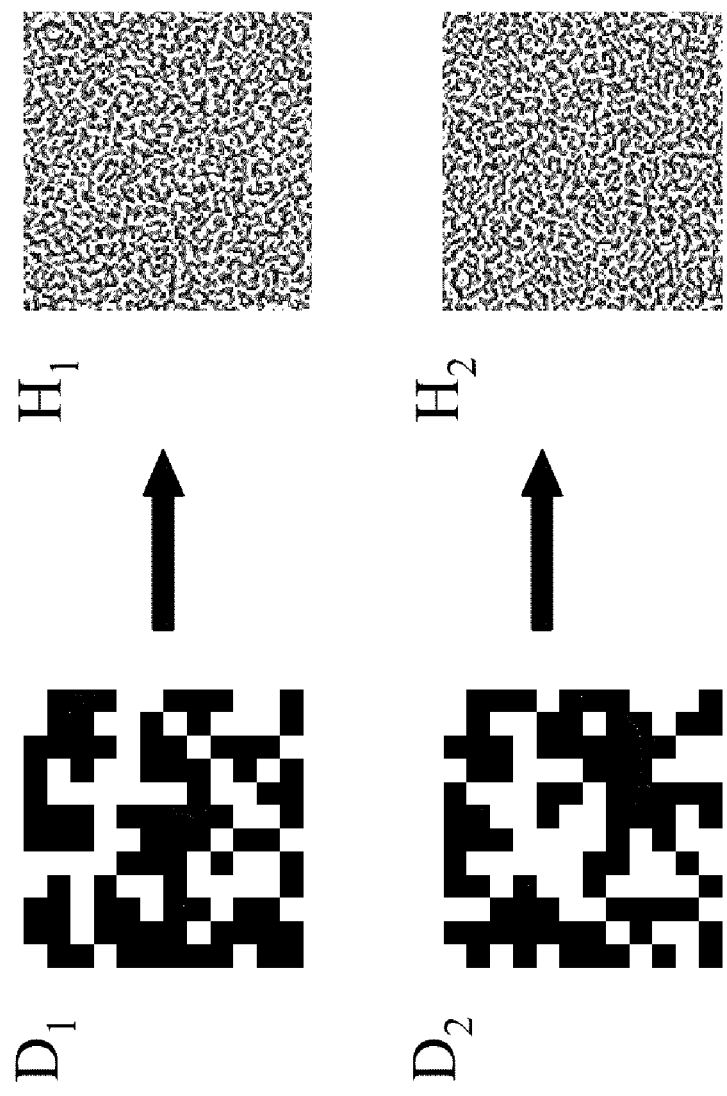
FIG. 3 shows a third step of the coding method.

In a third step (FIG. 3) of the coding method, the graphic data images $D_1$, $D_2$ are converted into computer-generated intermediate holograms $H_1$, $H_2$. This conversion can in particular be carried out by a standardized method for the generation of computer-generated holograms, such as the iterative Fourier transformation algorithm (IFTA). However, it is also possible to use a specifically configured algorithm which has been modified from the IFTA, for example, in order to achieve further encryption.

Figure 4:
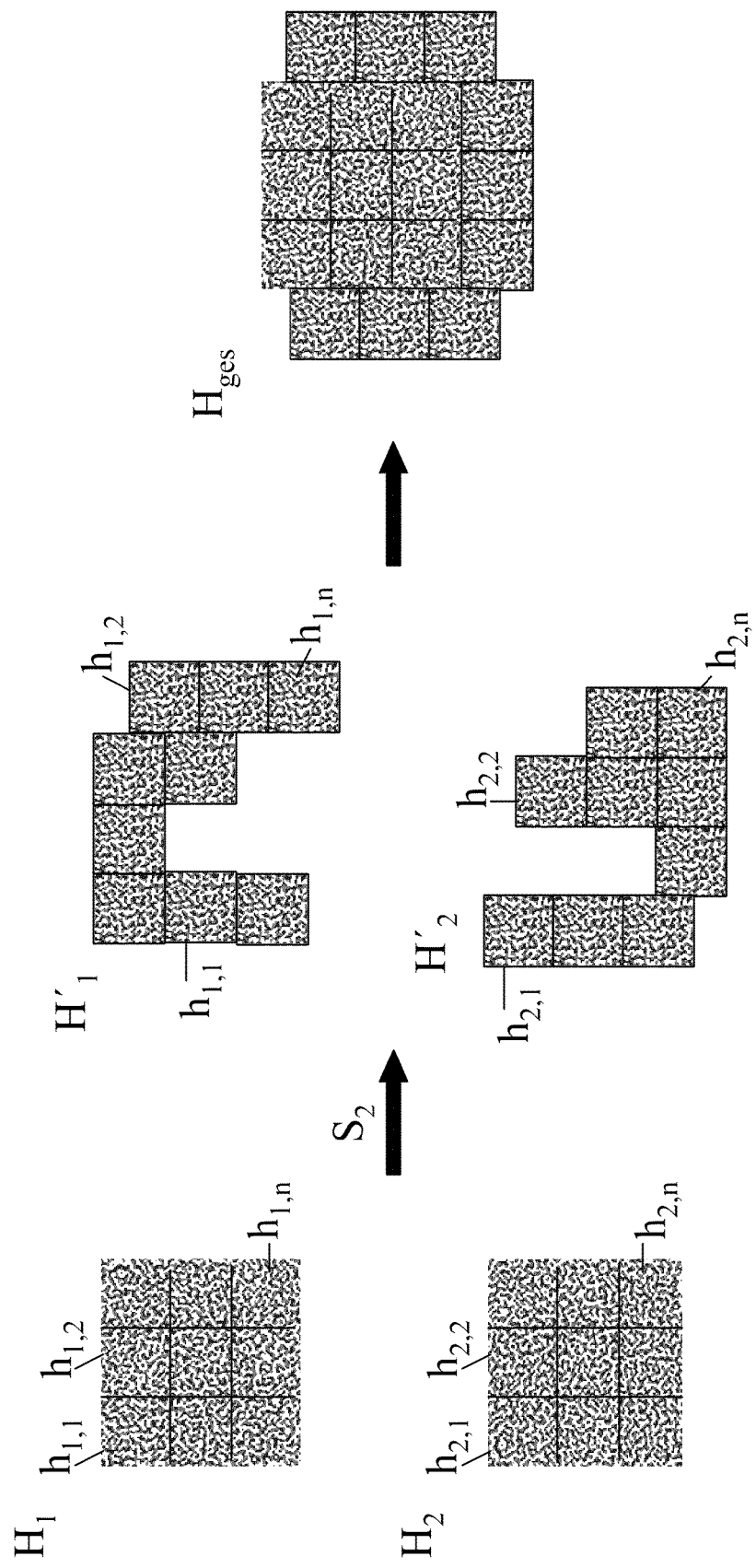
FIG. 4 shows a fourth step of the coding method.

In a fourth step (FIG. 4) of the coding method, the intermediate holograms $H_1$, $H_2$ are converted into holograms $H'_1$, $H'_2$ with the aid of an image key $S_2$. For this conversion, the first intermediate hologram $H_1$ is divided up into a plurality of subregions $h_{1,1}$, $h_{1,2}$, ..., $h_{1,n}$. These subregions $h_{1,1}$, $h_{1,2}$, ..., $h_{1,n}$ are arranged in the form of a two-dimensional pattern in a defined sequence, so that the first hologram $H'_1$ results. The second intermediate hologram $H_2$ is dealt with in a corresponding way, the subregions $h_{2,1}$, $h_{2,2}$, ..., $h_{2,n}$ being arranged in the form of a two-dimensional pattern in a defined sequence, which is inverted in relation to the two-dimensional pattern of the first hologram $H'_1$. The two-dimensional patterns of the first hologram $H'_1$ and of the second hologram $H'_2$ can thus be nested in each other in such a way that unused interspaces are avoided, which results in a hologram block $H_{ges}$, in which the two-dimensional patterns of the holograms $H'_1$, $H'_2$ cannot be seen. The two-dimensional pattern of the holograms $H'_1$, $H'_2$ defined uniquely by the image key $S_2$ is hidden completely in the hologram block $H_{ges}$.

Figure 5:
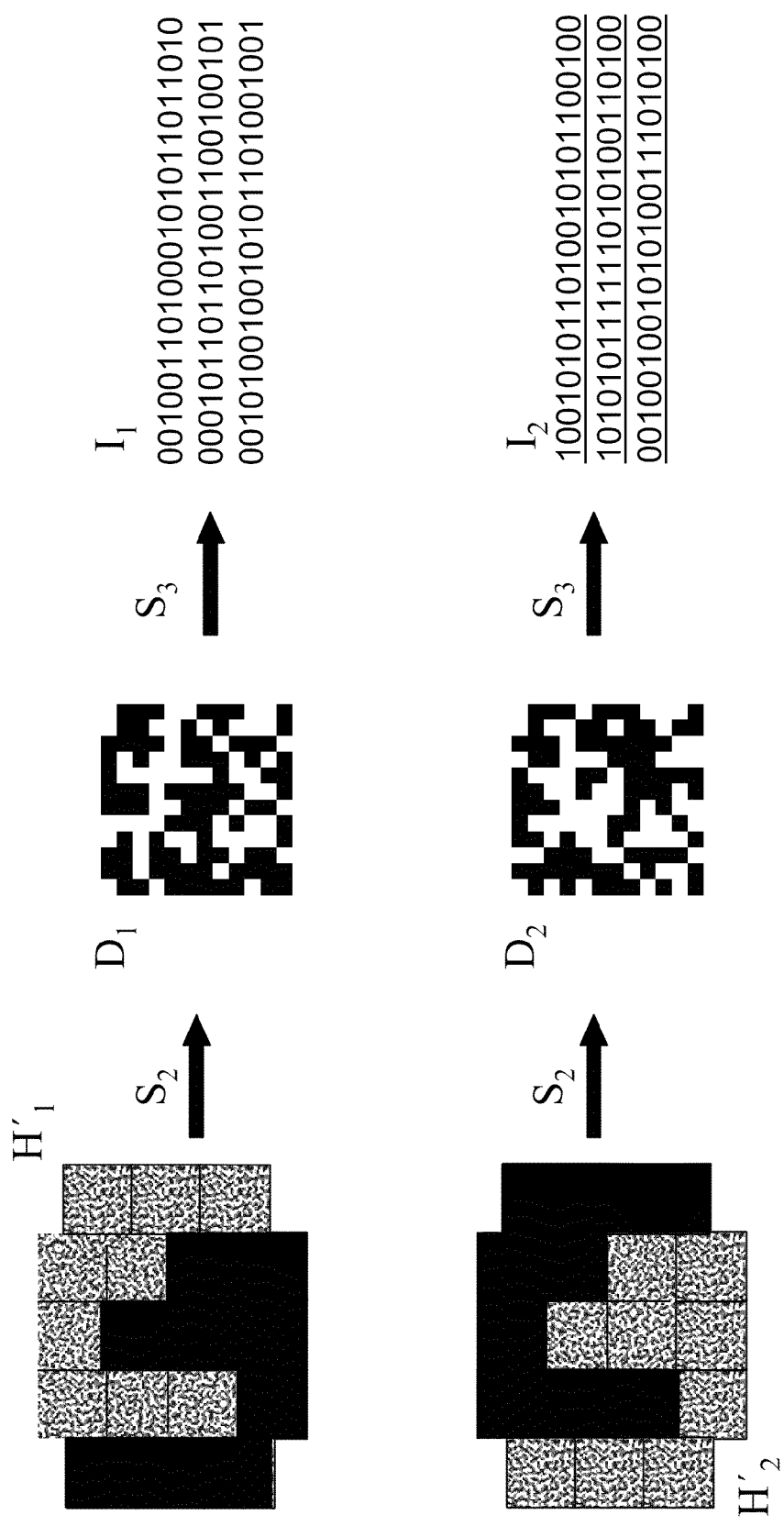
FIG. 5 shows a first and a second step of a decoding method according to the invention.

In order to decode the information stored in the hologram block $H_{ges}$ (FIG. 5), given knowledge of the two-dimensional patterns of the holograms $H'_1$, $H'_2$ firstly one of the two-dimensional patterns can be covered, for example with the aid of a filter, and only with the aid of the image key $S_2$ can the first hologram $H'_1$ be transformed back into the first data image $D_1$. Then, the first graphic data image $D_1$ can be converted back into the first part item of information $I_1$ with the aid of the conversion key $S_3$. The second hologram $H'_2$ is dealt with in a corresponding way, in this case the two-dimensional pattern of the hologram $H'_1$ being covered and only the second hologram $H'_2$ being visible.

Figure 6:
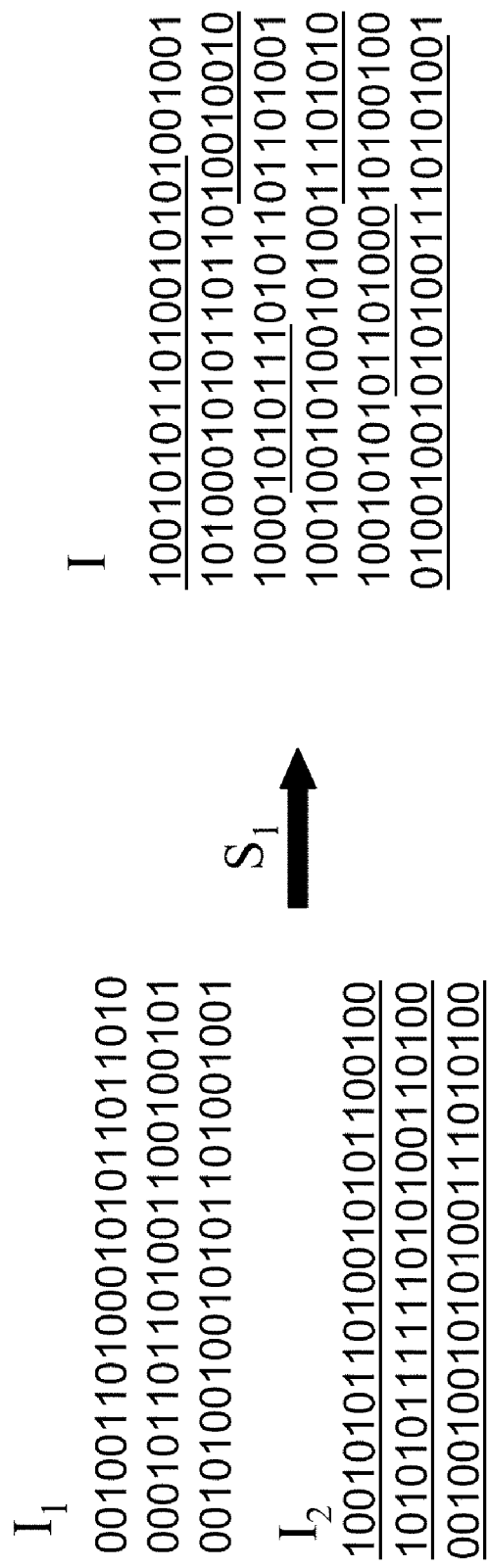
FIG. 6 shows a third step of the decoding method.

In a last step (FIG. 6) of the decoding method, the part items of information $I_1$, $I_2$ are changed into the desired unencrypted item of information I with the aid of the information key $S_1$.

Figure 7:
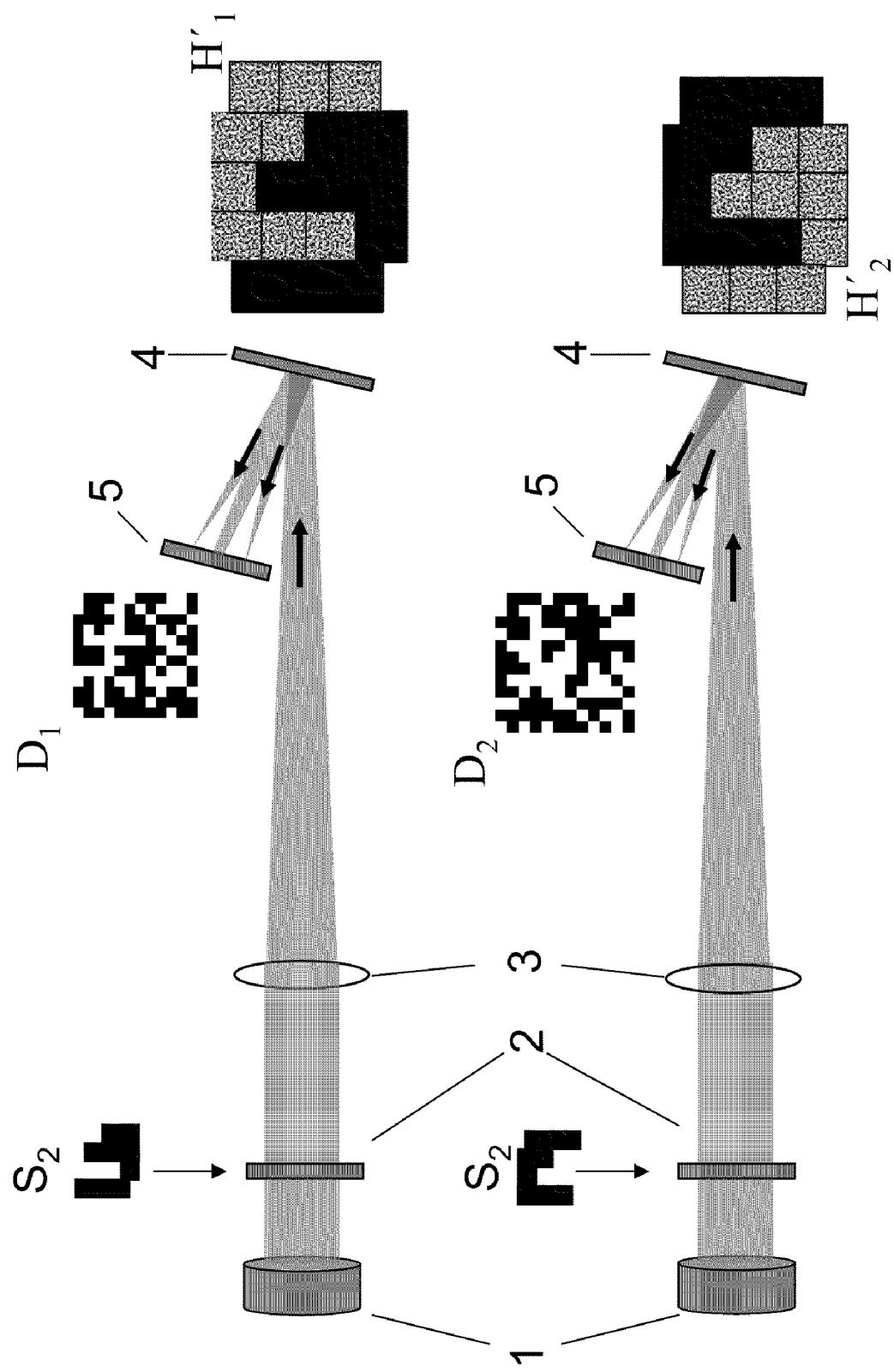
FIG. 7 shows a schematic view of a codec according to the invention.

In order to carry out the coding method and the decoding method, a codec (FIG. 7) has a radiation source 1 which, for example, generates a laser light beam. This beam of energy is deflected via a lens arrangement 3 onto a holographic data storage medium 4, which is arranged in a holding device, in order that virtually all the regions of the holographic data storage medium 4 can be illuminated. The light reflected from the holographic data storage medium 4 is detected by a receiver 5, in order to convert the hologram $H'_1$, $H'_2$ which has been read into the graphic data image $D_1$, $D_2$. A filter 2 is arranged in the beam path of the beam of energy, in particular before the beam of energy strikes the holographic data storage medium 4. In the exemplary embodiment illustrated, the filter 2 filters out either the two-dimension pattern of the second hologram $H'_2$ (top), or the two-dimensional pattern of the first hologram $H'_1$ (bottom). This two-dimensional pattern is defined uniquely by the image key $S_2$. In order to be able to change particularly simply between different two-dimensional patterns, the filter 2 can have a liquid crystal display, which sets the appropriate two-dimensional pattern as required. To this end, the liquid crystal display can be connected to a computer unit, in which the image key $S_2$ is stored.

The invention claimed is:

1. A coding method for the encryption of information worth protecting on a holographic data storage medium, comprising the steps:
    providing at least one item of information to be encrypted,
    converting the information into at least one graphic data image,
    converting the graphic data image into at least one hologram and
    writing the holographic data storage medium with the hologram,
    wherein before the holographic data storage medium is written with the hologram, the hologram is changed graphically, and
    wherein during the conversion of the graphic data image, the graphic data image and/or an intermediate hologram produced in an intermediate step is divided up into at least two subregions and, with the aid of different image keys, which defines a two-dimensional pattern uniquely, the subregions are converted into the hologram in the form of the two-dimensional pattern before the holographic data storage medium is written with this hologram.

2. A coding method according to claim 1, wherein interspaces not used by the two-dimensional pattern of the hologram are filled with holographic data.

3. A coding method according to claim 1, wherein the holographic data have at least one further hologram which has been produced from a further encrypted item of information, the two-dimensional pattern of the further hologram being created by taking into account the image key used previously.

4. A coding method according to claim 1, wherein the holographic data storage medium is written with a hologram block of standardized size and the hologram block has at least two holograms that are nested in each other and each associated with an item of information.

5. A coding method according to claim 1 wherein as a result of writing the holographic data storage medium with the hologram, a polarization hologram is produced.

6. A coding method according to claim 1 wherein the item of information to be encrypted is divided up into at least two part blocks which, with the aid of an information key, are divided up into at least two part items of information, in order to encrypt the respective part items of information separately in each case with the aid of the image key.

7. A coding method according to claim 1 wherein the conversion of the item of information into at least one graphic data image is carried out with the aid of a conversion key, the conversion key defining the number, the size and the rastering of the graphic data image.

8. A decoding method for the decryption of an item of information encrypted in accordance with the coding method according to claim 1, comprising:
   providing a holographic data storage medium having at least one hologram,
   irradiating the holographic data storage medium with a beam of energy in order to read the hologram, and
   receiving the beam of energy reflected at the holographic data storage medium with a receiver in order to convert the hologram into a graphic data image,
   wherein the beam of energy strikes a filter, which allows the beam of energy to pass through only partly in such a way that the beam of energy strikes the receiver in a two-dimensional pattern, the two-dimensional pattern being defined uniquely by an image key.

9. A decoding method according to claim 8, wherein the beam of energy strikes the holographic data storage medium in the two-dimensional pattern.

10. A decoding method according to claim 8 wherein the filter modulates the amplitude of the beam of energy physically.

11. A decoding method according to claim 8 wherein the filter used is a liquid crystal display.

12. A decoding method according to claim 11, wherein the liquid crystal display is connected to a computer unit, in which at least one image key is stored, in order to create the pattern impressed by the liquid crystal display as a function of the image key stored in the computer unit.

13. A system for encoding and/or decoding an item of information that is present in holographic form, comprising
   a radiation source for the production of a beam of energy,
   a lens arrangement for irradiating a holographic data storage medium with the beam of energy,
   a holding device for holding the holographic data storage medium, it being possible for the holding device and the lens arrangement to be moved relative to each other in such a way that the holographic data storage medium can be irradiated at a plurality of points, and
   a receiver for the detection of the beam of energy reflected from the holographic data storage medium,
   wherein in the beam path of the beam of energy there is arranged a filter, which changes the beam of energy in such a way that the beam of energy irradiates the receiver in a two-dimensional pattern, the two-dimensional pattern being defined uniquely by an image key.

14. A system according to claim 13, wherein the filter is arranged between the radiation source and the holographic data storage medium.

15. A system according to claim 13 wherein the filter has a liquid crystal display, which is connected to a computer unit in which at least one image key is stored, in order to produce the pattern impressed on the beam of energy by the liquid crystal display as a function of the image key.

16. A system according to claim 13 wherein the receiver is connected to a computer unit in order to convert the beam of energy received by the receiver into a data image.

17. A non-transitory data storage medium for the holographic storage of encrypted data according to the method of claim 1, having a data storage element for the storage of a hologram, wherein the data storage element has a plurality of holograms which have the form of a two-dimensional pattern which is defined uniquely by an image key, and wherein the data storage element has a film with photo-addressable polymers.

18. A non-transitory data storage medium according to claim 17, wherein the data storage element has a plurality of hologram blocks of standardized size, the hologram block having at least two holograms nested in each other associated with items of information.

19. A non-transitory data storage medium according to claim 17, wherein the holograms are polarization holograms.

* * * * *